April 1, 1924.

A. H. SWEET 1,488,718

BRAKE BAND

Filed Feb. 8, 1923

Inventor;
Alvin H. Sweet, per *[signature]*

Attorney.

Patented Apr. 1, 1924.

1,488,718

UNITED STATES PATENT OFFICE.

ALVIN H. SWEET, OF LOS ANGELES, CALIFORNIA, ASSIGNOR, BY DIRECT AND MESNE ASSIGNMENTS, TO TITLE GUARANTEE AND TRUST COMPANY, TRUSTEE, OF LOS ANGELES, CALIFORNIA.

BRAKE BAND.

Application filed February 8, 1923. Serial No. 617,773.

*To all whom it may concern:*

Be it known that I, ALVIN H. SWEET, a citizen of the United States, residing at Los Angeles, in the county of Los Angeles and State of California, have invented a new and useful Brake Band, of which the following is a specification.

My invention relates to brake bands, and particularly when they are housed or relatively inaccessible for relining. The objects of my improvement are, first, to provide a lining that may be removed from, or applied to a brake band without removing it from its normal position; and, second, to afford facilities for slipping the lining into the band in an axial direction.

Other objects and advantages will appear hereinafter, and while I show herewith and will describe a preferred form of construction, I desire to be understood that I do not limit myself to such preferred form, but that various changes and adaptations may be made therein without departing from the spirit of my invention as hereinafter claimed.

These objects are attained by the construction illustrated in the accompanying drawing, in which—

Figure 1:
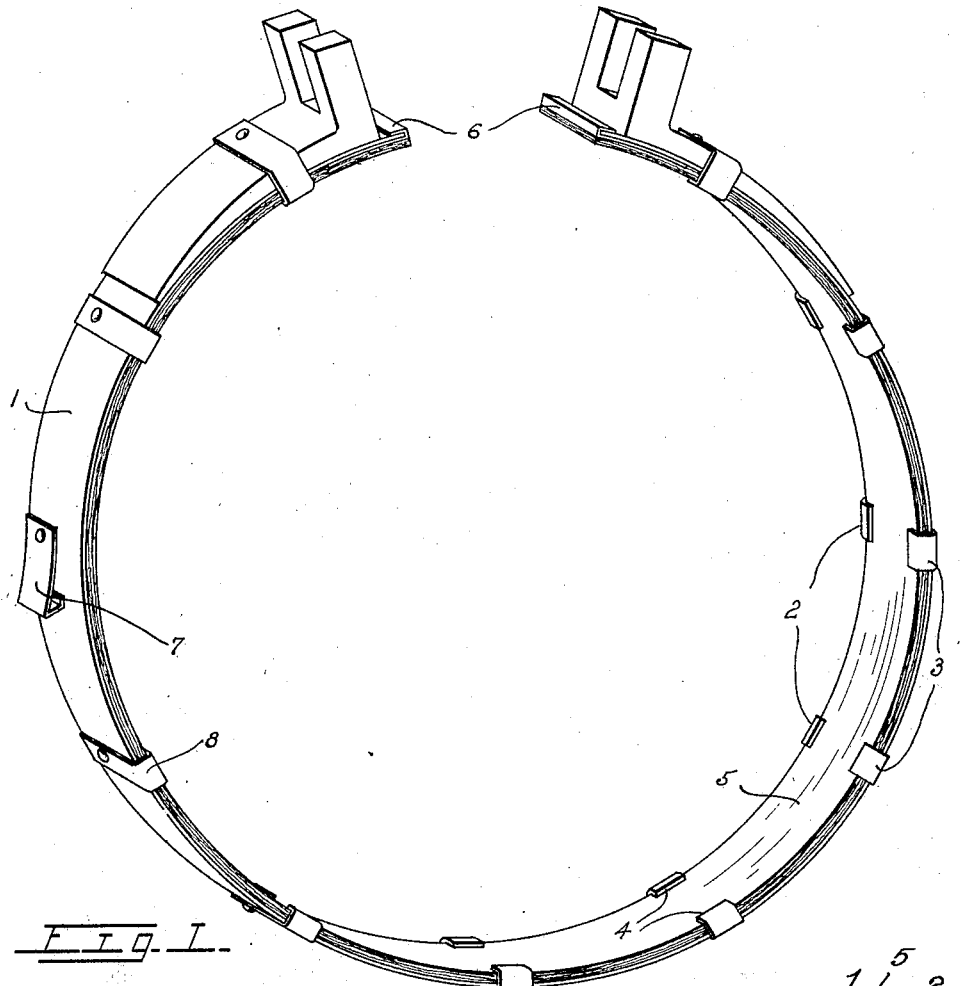
Figure 3:
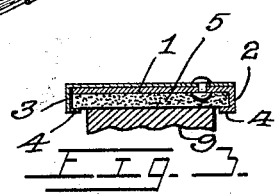
Figure 2:
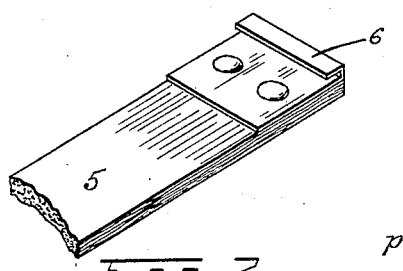

Figure 1 is a perspective view of my improved brake band, and Figure 2 is a similar view of an end fragment of the lining. Figure 3 is a cross section of the band taken through the center of one of the pivoted lugs used for attaching the lining.

Similar numerals refer to similar parts throughout both views.

The strap 1 is made with inwardly turned integral lugs 2 on one of its edges, and with pivoted resilient lugs 3 opposed to the fixed lugs. Both sets of lugs are flanged, as at 4, for retaining the lining 5 within the strap. The brake drum 9 must therefore run between these opposed flanges which serve to keep the band in alignment upon the drum.

The lining, after it is cut to approximately the proper length, has metal ends 6 riveted to each end. The lining is installed by slipping it into the strap in an axial direction after the pivoted lugs 3 have been turned into the position indicated at 7 in Fig. 1. The pivoted lugs are then turned into their normal position as shown at 8.

Metal ends 6, shaped as shown, are slipped over the ends of the strap and prevent the lining from "crawling."

The construction and operation of the invention will be clear from the foregoing description. It will also be obvious that the device is relatively inexpensive, and affords means for relining with a minimum of expense and trouble.

Certain features of this invention are shown in a previous application filed by me on July 27, 1922, Serial Number 577,935, which has matured into Patent Number 1,460,118, June 26, 1923, and in companion applications filed coincidently with this. None of these applications however claims what is claimed herein.

I claim:

1. A brake band having at one side inwardly extending integral lugs and at the other side inwardly extending pivoted lugs, said lugs having flanges thereon whereby a lining may be positioned and retained within said band.

2. A brake band having spaced integral lugs extending inwardly from one edge thereof and spaced pivoted lugs extending inwardly from the other edge thereof, said lugs being adapted for positioning and retaining a lining within said band.

3. A brake band having spaced integral lugs at one edge thereof and spaced pivoted lugs at the other edge thereof, said lugs extending inwardly from said edges and being adapted for maintaining a lining in fixed axial relation to said band; and means for retaining said lining in fixed angular relation to said band.

4. A brake band having spaced integral lugs and opposed pivoted lugs extending inwardly from the respective edges thereof and a removable lining within said band; said lugs being adapted for positioning and retaining said lining within said band.

5. A brake band having spaced integral lugs and opposed pivoted lugs extending inwardly from the respective edges thereof and a removable lining within said band; said lugs being adapted for maintaining said lining in fixed axial relation to said band; and means for maintaining said lining in fixed angular relation to said band.

ALVIN H. SWEET.